United States Patent [19]

Fix et al.

[11] Patent Number: 4,499,565
[45] Date of Patent: Feb. 12, 1985

[54] METHOD AND APPARATUS FOR RECORDING BROAD-BAND SEISMIC DATA

[75] Inventors: James E. Fix, Richardson; Gary A. Crews, Plano, both of Tex.

[73] Assignee: Atlantic Richfield Company, Los Angeles, Calif.

[21] Appl. No.: 110,956

[22] Filed: Jan. 10, 1980

[51] Int. Cl.³ .............................................. G01V 0/00
[52] U.S. Cl. .......................................... 367/49; 367/58
[58] Field of Search ............................. 367/49, 58, 43

[56] References Cited

U.S. PATENT DOCUMENTS

| | | | |
|---|---|---|---|
| 2,906,363 | 9/1959 | Clay, Jr. | 367/58 |
| 3,400,783 | 9/1968 | Lee et al. | 367/58 |
| 3,863,200 | 1/1975 | Miller | 367/49 |
| 4,020,447 | 8/1977 | Michon et al. | 367/20 |
| 4,122,431 | 10/1978 | Peraldi | 367/58 |

FOREIGN PATENT DOCUMENTS

| | | | |
|---|---|---|---|
| 1176881 | 8/1964 | Fed. Rep. of Germany | 367/58 |
| 1391829 | 4/1975 | United Kingdom | 367/58 |

OTHER PUBLICATIONS

"Performance of Resonant Seismometers", Donn et al., Geophysics, vol. 19, No. 4, pp. 802–819, Oct. 1954.

Primary Examiner—Howard A. Birmiel
Attorney, Agent, or Firm—Robert M. Betz

[57] ABSTRACT

A receiver array for detecting seismic reflections is composed of geophones of several different natural frequencies divided into subarrays having lengths compatible with the natural frequencies of their geophones and the seismic wavelengths at the recording site. This system provides both frequency and spatial filtering at the sensors so as to enhance the signal-to-noise ratio of broad-band seismic signals.

7 Claims, 2 Drawing Figures

METHOD AND APPARATUS FOR RECORDING BROAD-BAND SEISMIC DATA

BACKGROUND OF THE INVENTION

1. Field of the Invention

This invention relates generally to the art of seismic prospecting and more particularly to an improved means and method for recording reflected seismic signals.

2. Description of the Prior Art

In reflection seismic exploration, field techniques are utilized to enhance the reflection signal with respect to the unwanted signal and with respect to the noise within the system components. In most reflection seismic field recording a spatial/wavenumber filter (x/k) is formed with either or both source arrays or receiver arrays. Often the data are time/frequency filtered (t/w) in the electronic instrumentation before recording. A typical receiver array formed in accordance with the prior art consists of geophones of a single natural frequency usually in the range of 8–14 Hz. The overall array length is made equal to or greater than the longest wavelength of the anticipated noise. In this manner it is hoped that most noise frequencies will be eliminated. For example an array of this character for P-wave propagation could be 200–400 feet in length and for shear wave work about 900 feet. The difficulty with this technique is that the high frequency response of the geophones to desired reflections is also so attenuated that it is beyond the dynamic range of typical analog-to-digital converters. The longer the array, the greater the attenuation of wanted high frequency components of the reflected signal.

The effect described above is not noticeable in the 10–50 Hz range of seismic data currently used in petroleum exploration. However, broad-band signals are highly desirable in order to maintain identifiable signal characteristics from reflection coefficient series while maintaining the higher frequencies for resolution of thin beds. See in this connection the figure and accompanying discussion on page 231 of Waters, Reflection Seismology, copyright 1978, John Wylie and Sons. This reference shows that a reflected pulse increases in discreteness or "definition" in direct proportion to increase in band width, a highly useful attribute in defining the presence of closely spaced layers.

In the newly developing art of reflection seismology applied to mineral exploration there has also been a failure to recognize the importance of broad-band seismic data with concentration only on high frequencies.

Given the limited digitization precision of present recording systems for recording broad-band signals, it is necessary to utilize some form of frequency dependent amplitude shaping to counteract attenuation of higher frequencies by the earth and to provide signals of all desired frequencies within this limited digitization precision.

It is therefore a general object of this invention to provide an improved means and method for enhancing the signal-to-noise ratio of broad-band signals in reflection seismic exploration.

It is a more specific object of this invention to provide an improved means and method for frequency-dependent amplitude shaping of broad-band seismic signals.

Other objects and advantages of this invention will become apparent from a consideration of the detailed description and drawings to follow taken in conjunction with the appended claims.

SUMMARY OF THE INVENTION

In order to record broad band reflection seismic data by combined frequency and wavenumber filtering, a seismic receiver array is provided consisting of a plurality of receiver subarrays, the natural frequency of the receivers being different for each subarray so as to provide frequency filtering over a broad-band of reflected frequencies. Each of the subarrays has an overall length adapted to pass a different portion of the reflected signal frequencies while providing spatial filtering of coherent noise at or above the natural frequencies of the receivers of such subarray. The higher the natural receiver frequency, the shorter is the overall length of the associated subarray. In this manner much of the reflected energy at higher frequencies which would otherwise be rejected is preserved. The invention also comprises the method for enhancing the signal-to-noise ratio of broad-band seismic signals as carried out by such array.

The invention further comprises a system and method as described wherein the output of the receivers is weighted as a function of the natural frequency thereof. If desired the output of each subarray may be individually recorded or their outputs may be summed and recorded together as a single data channel.

DESCRIPTION OF THE PREFERRED EMBODIMENT

Figure 1:
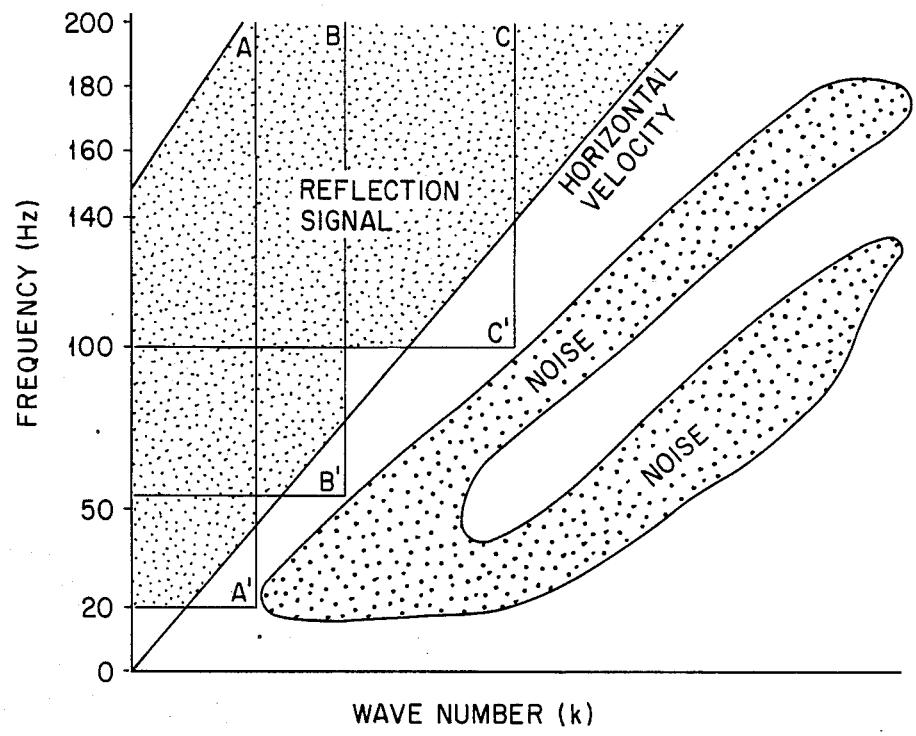
FIG. 1 illustrates a plot of a frequency wavenumber domain with hypothetical array rejection patterns superimposed thereon.

With reference now to FIG. 1, there is shown a two-dimensional plot of the frequency-wavenumber domain for a hypothetical seismic signal on which are superimposed rejection patterns corresponding to a seismic receiver array comprised of geophones of different natural response frequencies. For purposes of illustration, three such patterns are shown for 20, 50 and 100 Hz geophone arrays. The geophones act as frequency filters that produce attenuation of signals with frequencies below their respective natural frequencies. These arrays are assumed to have overall lengths adapted to produce attenuation of signals having wavenumbers to the right of lines A—A$^1$, B—B$^1$ and C—C$^1$ respectively. Reflected signals occupy the area above the line whose angular position represents horizontal or apparent signal velocity, while coherent noise occupies an area as shown below such line.

Inspection of FIG. 1 shows that a geophone array composed exclusively of 20 Hz geophones will reject a substantial portion of reflected signal and that the loss increases with increasing signal frequency. In the 10–50 Hz range of seismic data currently used in petroleum exploration this effect is not significant. But given the known attenuation by the earth of the higher reflected signal frequencies, it is apparent that this type of geophone array is ineffective in recording of broad-band seismic data. Referring again to FIG. 1, it is noted that a 50 Hz array allows recording of a substantial portion of the signal rejected by the 20 Hz array, although of course excluding frequencies below 50 Hz. Similarly, a further portion of the high frequency reflected signal is recovered by use of a 100 Hz array. Thus, by simultaneously employing geophones of differing natural response, one can capture the bulk of the available reflected energy over a band of interest.

Figure 2:
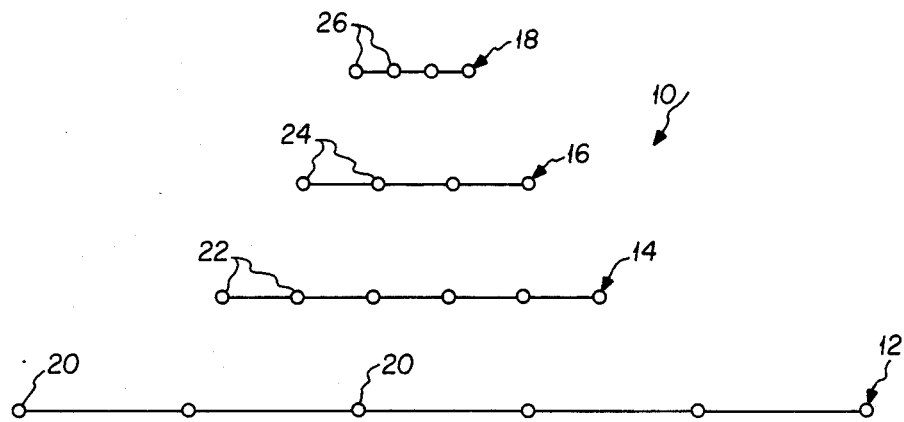
FIG. 2 is a diagrammatic representation of a receiver array in accordance with this invention.

In the light of the above analysis, in order to enhance the signal-to-noise ratio of broad-band reflected signals, the method and system of this invention is carried out by the formation of a receiver array composed of groups of geophones of several different natural frequencies. Sub-elements of the receiver array are provided with lengths compatible with the natural frequency of the geophones of that sub-element and the seismic wave lengths at the recording site. The geophones within each sub-element array may be evenly spaced, unevenly spaced, amplitude weighted or placed or weighted in any manner as used in the prior art for spatial filtering. This system therefore provides both frequency and spatial filtering at the sensors. FIG. 2 illustrates such a receiver array 10 comprised of any desired number of subarrays such as subarrays 12, 14, 16, and 18 formed respectively of geophones 20, 22, 24, and 26 shown with even spacing for simplicity. Subarray 12 is seen to be the longest in overall length and geophones 20 have the lowest natural frequency. Subarrays 14 and 16 are progressively shorter with geophones 22 and 24 of progressively higher natural frequency. Subarray 18 is the shortest and geophones 26 have the highest natural frequency. The number of geophones in each subarray, their spacing, and the number of such subarrays is not critical to this invention. The composite effect of utilizing a receiver array 10 is that of superimposing the rejection patterns of subarrays 12 through 18 on a wavefield represented in the frequency-wavenumber domain shown in FIG. 1 and in the manner previously described. The method of calculating their respective lengths will be illustrated below.

A major consideration in the design of an array in accordance with this invention is the elimination of surface waves (Rayleigh or Love) commonly called ground roll. It is recognized that surface waves have a strong low frequency content so that long length arrays are necessary to provide adequate cancellation of ground roll. Assume for illustration that the surface wave velocity is 1,800 ft./sec. Then, from the relationship $V_a = \lambda \cdot f$ where $V_a$ = apparent velocity, $\lambda$ = wavelength and f = frequency, one can calculate a value for $\lambda$ for any given frequency. Subarrays 12 through 18 may then be given overall lengths equal to or greater than the value of $\lambda$ so calculated. Pursuing the above example further, in one possible array of geophones 10, six 20 Hz geophones 20 are implanted with an overall length of 90 feet to form subarray 12; six 50 Hz geophones 22 are implanted with a length of 36 feet to form subarray 14; four 100 Hz geophones 24 are implanted with an overall length of 18 feet to form subarray 16, and finally, four 200 Hz geophones 26 are implanted with an overall length of 9 feet to form subarray 28.

Assuming that the seismic source to be employed radiates all frequencies with equal amplitude, the relative amplitude of the higher frequency reflections will be attenuated severely. In a typical situation 200 Hz reflections may be on the order of 100 db lower in amplitude than 20 Hz reflections. Although in the array of FIG. 2 such 200 Hz reflections will have a 20:6 weighting with respect to 20 Hz reflections, stronger weighting will generally be necessary to match the digitization precision of recording systems. Weights may be applied therefore to individual subarrays 12 through 18 by well known means to bring the signal within the precision of an analog-to-digital converter for the 20–200 Hz band.

Within the scope of this invention, and by well known means, the receiver subarrays as described may be individually recorded or can be summed and recorded as a single data channel. Weighting, as described, may be accomplished either with passive elements such as resistors or with low noise active elements such as amplifiers.

The invention and system described are applicable to compressional waves and to both vertically and horizontally polarized shear waves. Furthermore, the method and system may be applied equally to marine or land geophysical exploration.

We claim:

1. A method for enhancing the signal-to-noise ratio of broad-band seismic signals comprising the steps of forming a receiver array consisting of a plurality of subarrays of said receivers, said receivers having preselected natural frequencies varying from one subarray to another, over a desired frequency range, and selecting the respective lengths of said receiver subarrays to provide spatial filtering of coherent noise at or above the natural frequency of the receivers of said respective subarrays.

2. The method as claimed in claim 1 wherein the output of said receivers is weighted as a function of the natural frequency thereof.

3. The method as claimed in claim 1 including the step of summing and recording the output of said subarrays as one data channel.

4. The method as claimed in claim 1 wherein the output of the receivers of each of said subarrays is individually recorded.

5. A seismic receiver array for enhancing the signal-to-noise ratio of broad-band seismic signals comprising a plurality of subarrays of said receivers, the natural frequency of said receivers being varied from one subarray to another over said broad frequency band, each of said subarrays having a length adapted to provide spatial filtering of coherent noise at or above the natural frequencies of the receivers thereof.

6. The apparatus of claim 5 wherein the natural frequencies of the respective receivers of said subarrays increase in a regular manner to counteract the earth's attenuation.

7. A seismic field recording system comprising a receiver array divided into subarrays composed of receivers varying in natural frequency from one subarray to another over a desired band of frequencies, each of said subarrays having a length such as to spatially filter coherent noise at frequencies at or higher than the natural frequencies of the receivers of said subarray, analog-to-digital converter means for recording the output of said receivers, and means for weighting the output of said receivers as a function of the natural frequency thereof.

* * * * *